(12) United States Patent
Nishijima

(10) Patent No.: US 10,420,193 B2
(45) Date of Patent: Sep. 17, 2019

(54) CONTROL SYSTEM

(71) Applicant: DENSO CORPORATION, Kariya, Aichi-pref. (JP)

(72) Inventor: Fumiyoshi Nishijima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/309,640

(22) PCT Filed: Jun. 15, 2017

(86) PCT No.: PCT/JP2017/022169
§ 371 (c)(1),
(2) Date: Dec. 13, 2018

(87) PCT Pub. No.: WO2017/217500
PCT Pub. Date: Dec. 21, 2017

(65) Prior Publication Data
US 2019/0182929 A1 Jun. 13, 2019

(30) Foreign Application Priority Data
Jun. 15, 2016 (JP) .................. 2016-118913

(51) Int. Cl.
H05B 37/02 (2006.01)
G05B 19/042 (2006.01)
(Continued)

(52) U.S. Cl.
CPC ....... *H05B 37/0227* (2013.01); *G01K 15/007* (2013.01); *G05B 19/042* (2013.01); *B60Q 1/04* (2013.01); *G05B 2219/25257* (2013.01)

(58) Field of Classification Search
CPC .. H05B 37/02; H05B 37/029; H05B 37/0227; H05B 33/086; H05B 33/0854;
(Continued)

(56) References Cited

U.S. PATENT DOCUMENTS 6,684,154 B2 * 1/2004 Isobe ............... F02D 35/025
701/113
6,694,246 B2 * 2/2004 Masuda ............ F01P 11/14
123/41.1

(Continued)

FOREIGN PATENT DOCUMENTS

JP 2000-075262 3/2000

*Primary Examiner* — Haissa Philogene
(74) *Attorney, Agent, or Firm* — Knobbe, Martens, Olson & Bear, LLP

(57) ABSTRACT

A determining unit performs failure determination for lights. In failure determination, a first temperature value and a second temperature value are compared, and when the difference between the first temperature value and the second temperature value is equal to or higher than a preset determination threshold value, either one of a first temperature sensor and a second temperature sensor is determined to be faulty. The first temperature value is the temperature value of a first control device acquired by the first temperature sensor during the execution of lighting control of a first lamp. The second temperature value is the temperature value of a second control device acquired by the second temperature sensor during the execution of lighting control of a second lamp.

6 Claims, 3 Drawing Sheets

(51) Int. Cl.
*G01K 15/00* (2006.01)
*B60Q 1/04* (2006.01)

(58) Field of Classification Search
CPC ............ G09G 3/3406; G09G 2330/12; G05B 19/042; G05B 2219/25257; F02D 35/025; F02D 41/222; F02D 41/1441; F02D 41/1447; B60Q 1/04; B60Q 2300/146
See application file for complete search history.

(56) References Cited

U.S. PATENT DOCUMENTS

| | | | |
|---|---|---|---|
| 9,699,861 B2* | 7/2017 | Ohno | H05B 37/02 |
| 2015/0132615 A1* | 5/2015 | Yun | H01M 10/486 |
| | | | 429/50 |
| 2018/0242421 A1* | 8/2018 | Ohta | H05B 33/0854 |

* cited by examiner

CONTROL SYSTEM

CROSS REFERENCE TO RELATED APPLICATION

This application is a national stage application of PCT Application No. PCT/JP2017/022169, filed on Jun. 15, 2017, which claims the benefit of priority from Japanese Patent Application No. 2016-118913 filed on Jun. 15, 2016, the contents of which are hereby incorporated by reference.

TECHNICAL FIELD

The present disclosure relates to a control system for controlling electric power that is supplied to a light source.

BACKGROUND ART

In the backlight of a liquid-crystal display device, increase in temperature of the device due to heat generation of a light source is monitored using a temperature sensor, and electric power according to the temperature is supplied. In relation to this, the following patent literature 1 proposes a technique in which electric power supplied to a cold-cathode tube is restricted when increase in temperature of the device is not detected while the electric power is supplied to the cold-cathode tube as a light source.

CITATION LIST

Patent Literature

[PTL 1]: JP 2000-075262 A

SUMMARY OF THE INVENTION

However, as a result of detailed examination by the inventors, the above-described technique is found to have a problem in that it is not possible to determine whether or not the cause of the increase in temperature of the device not being detected is an abnormality of the temperature sensor. In other words, for example, an abnormality in a temperature sensor that measures the temperature of a device, a decrease in the outside air temperature, or the like may be considered as a cause of the increase in temperature of the device not being detected during the supply of electric power to the light source. However, in the above-described technique, it is not possible to determine these causes.

One aspect of the present disclosure is to provide a technique for accurately determining, when a temperature of a device does not increase despite it being supplied with electrical power, whether an abnormality has occurred in the temperature sensor.

The control system according to one aspect of the present disclosure includes a first control device, a second control device, a first temperature sensor, a second temperature sensor and a determining unit.

The first control device performs lighting control of a first lamp installed in a vehicle.

The second control device performs lighting control of a second lamp installed in the vehicle.

The first temperature sensor acquires a temperature value of the first control device.

The second temperature sensor acquires a temperature value of the second control device.

The determining unit compares a first temperature and a second temperature. The first temperature is a temperature value of the first control device acquired by the first temperature sensor during the execution of lighting control of the first lamp. The second temperature is a temperature value of the second control device acquired by the second temperature sensor during the execution of lighting control of the second lamp. The determining unit performs failure determination for determining that either one of the first temperature sensor and the second temperature sensor is faulty in the case where a difference between the first temperature value and the second temperature value is equal to or greater than a preset determination threshold value.

The first temperature value may be a temperature value of the first control device acquired by the first temperature sensor at a determination timing. The determination timing may be timing when a preset set time has elapsed since lighting control of the first lamp and lighting control of the second lamp has started. The second temperature value may be a temperature value of the second control device acquired by the second temperature sensor at the determination timing.

In the case where the difference between the first temperature value and the second temperature value is large, the temperature value detected by a normal temperature sensor increases according to the temperature of the lamp. However, it is considered that the temperature value detected by a faulty temperature sensor does not increase regardless of the temperature of the lamp. Moreover, in the case where the difference between the first temperature value and the second temperature value is small, both the first temperature sensor and the second temperature sensor are normal, and both the first control device and the second control device are thought to be equally affected by the outside temperature.

In this way, in the control system according to the present disclosure, in the case where the difference between the first temperature value and the second temperature value is equal to or greater than the preset determination threshold value, either one of the first temperature sensor and the second temperature sensor is determined to be faulty. As a result, it is possible to accurately determine whether or not the cause of the increase in temperature of a device not being detected during the supply of electric power to the light source is abnormality in the temperature sensor.

Note that the reference numerals in parentheses described in the claims indicate the correspondence with specific means described in the embodiments described later as an embodiment and do not limit the technical scope of the present disclosure.

DESCRIPTION OF EMBODIMENTS

Hereinafter, an embodiment according to the present disclosure will be described with reference to the drawings.

1. Configuration

Figure 1:
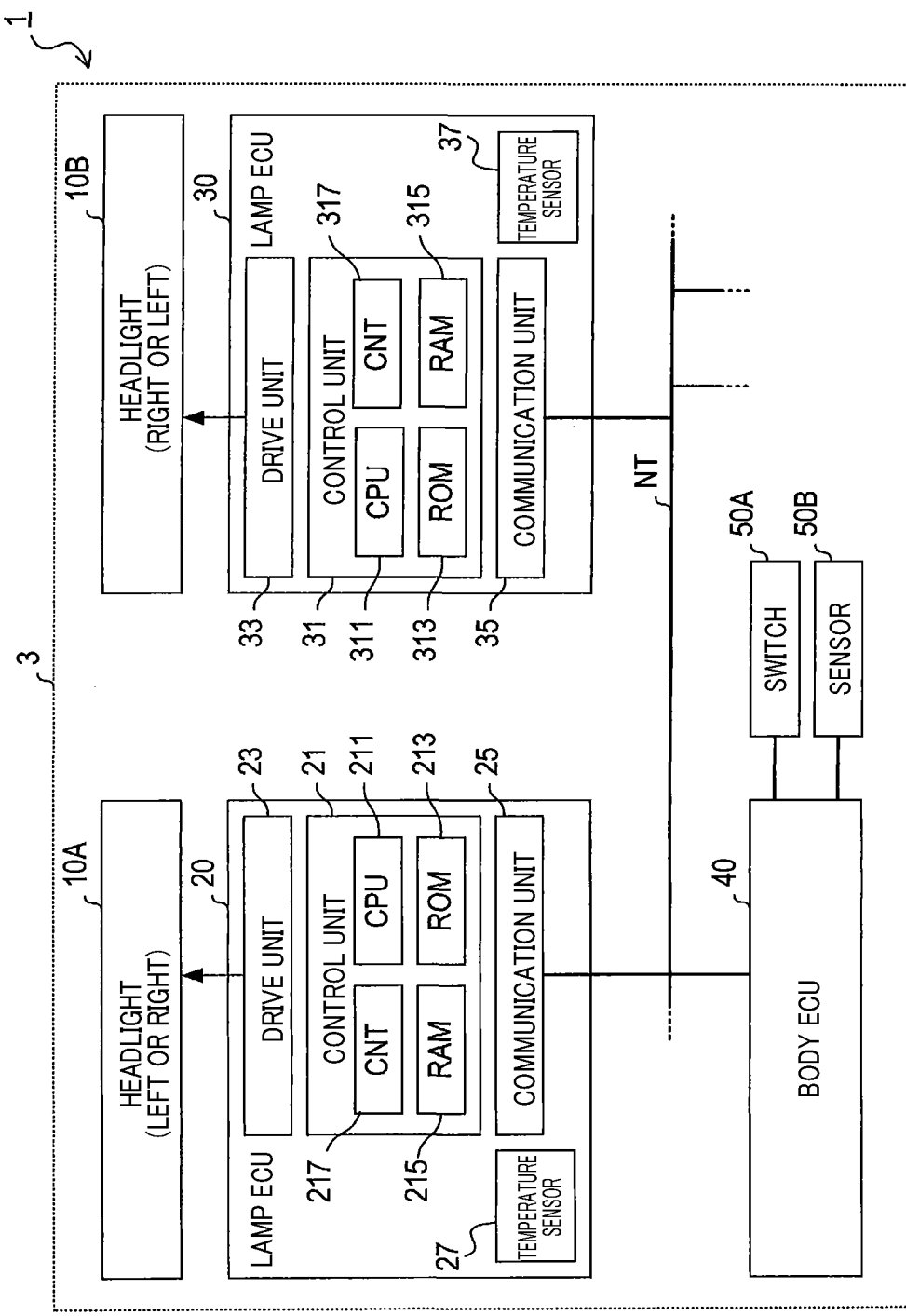
FIG. 1 is a block diagram illustrating a schematic configuration of a control system.

The control system 1 of the present embodiment illustrated in FIG. 1 controls turning ON and OFF a plurality of headlights 10A, 10B installed on each of the right side and the left side of a vehicle 3.

The plurality of headlamps 10A, 10B, for example, includes LED lamps. The headlights 10A, 10B, for example, include lamps of the same standard quantity of light. In FIG. 1, the headlight 10A is installed on the left side, but each of the plurality of headlights 10A, 10B may be installed on the left side or on the right side.

The control system 1 includes a lamp ECU 20, a lamp ECU 30, and a body ECU 40. ECU is an abbreviation for "Electronic Control Unit".

The lamp ECU 20 is an electronic control unit for controlling the headlight 10A. The lamp ECU 20 includes a control unit 21, a drive unit 23, a communication unit 25, and a temperature sensor 27.

The control unit 21 has a microcomputer that performs overall control of each unit of the lamp ECU 20. The microcomputer includes a CPU 211, ROM 213, RAM 215, and counter 217. Various functions of the control unit 21 are realized by the CPU 211 executing a program stored in a non-transitory tangible computer readable storage medium. In this example, the ROM 213 corresponds to a non-transitory tangible computer readable storage medium that stores a program. In addition, by executing this program, a method corresponding to the program is executed. The RAM 215 is used as a work area when processing is executed by the CPU 211. The counter 217 has a time measuring function. Note that, the control unit 21 may include one microcomputer or a plurality of microcomputers. The method of realizing these elements of the control unit 21 is not limited to software, and part or all of the elements may be realized by using one or a plurality of hardware. For example, in the case where the above-described function is realized by an electronic circuit as hardware, the electronic circuit may be realized by a digital circuit including a number of logic circuits, an analog circuit, or a combination thereof.

The drive unit 23 turns ON or OFF the headlight 10A according to a control signal from the control unit 21. More specifically, the drive unit 23 has a light adjustment function that, by changing the applied current to the headlight 10A according to the control signal, adjusts the light quantity of the headlight 10A within a range from zero to 100% corresponding to the standard light quantity.

The communication unit 25 is connected to an in-vehicle network NT and communicates with each node in the in-vehicle network NT. For example, a CAN is used for the in-vehicle network NT. CAN is an abbreviation for "Controller Area Network". CAN is also a registered trademark. In this case, the communication unit 25 is connected to the lamp ECU 30 and the body ECU 40 via a CAN bus.

The temperature sensor 27 has an element that outputs a signal corresponding to the temperature. As such an element, for example, a thermistor or a thermocouple is used. The temperature sensor 27 detects the temperature value of the lamp ECU 20. The temperature sensor 27 outputs a signal corresponding to the detected temperature value to the control unit 21.

The lamp ECU 30 is an electronic control device that performs lighting control of the headlight 10B. The lamp ECU 30 includes a control unit 31, a drive unit 33, a communication unit 35, and a temperature sensor 37. The control unit 31 has the same configuration as the control unit 21. The drive unit 33 has the same configuration as the drive unit 23. The drive unit 33 turns ON or OFF the headlight 10B according to a control signal from the control unit 31. Similar to the drive unit 23, the drive unit 33 has a light adjustment function. The communication unit 35 has the same configuration as the communications unit 25. The communication unit 35 is connected to the in-vehicle network NT. The temperature sensor 37 has the same configuration as the temperature sensor 27. The temperature sensor 37 detects the temperature value of the lamp ECU 30.

The body ECU 40 is an electronic control device that manages body-related devices such as door locks, lights, power windows, and the like. The body ECU 40 manages the operation of the body-related devices by outputting instructions via the in-vehicle network NT to the electronic control device that essentially controls each body-related device. For example, the body ECU 40 manages turning ON and OFF the plurality of headlights 10A, 10B by outputting a lighting turn-ON or turn-OFF instruction to the lamp ECU 20 via the in-vehicle network NT. The body ECU 40 is connected with a switch 50A operable by a person riding in the vehicle and a sensor 50B capable of detecting brightness outside the vehicle. Based on an operation signal from the switch 50A or a detection signal from the sensor 50B, the body ECU 40 outputs a lighting turn-ON or turn-OFF instruction to the lamp ECU 20.

2. Correspondence of Terms

The headlight 10A corresponds to a first lamp. The headlight 10B corresponds to a second lamp. The lamp ECU 20 corresponds to a first control device. The control unit 21 corresponds to a determining unit and a specifying unit. The temperature sensor 27 corresponds to a first temperature sensor. The lamp ECU 30 corresponds to a second control device. Temperature sensor 37 corresponds to a second temperature sensor.

3. Processing

Various processes executed by the control system 1 will be described.

[3-1. First Control Process]

Figure 2:
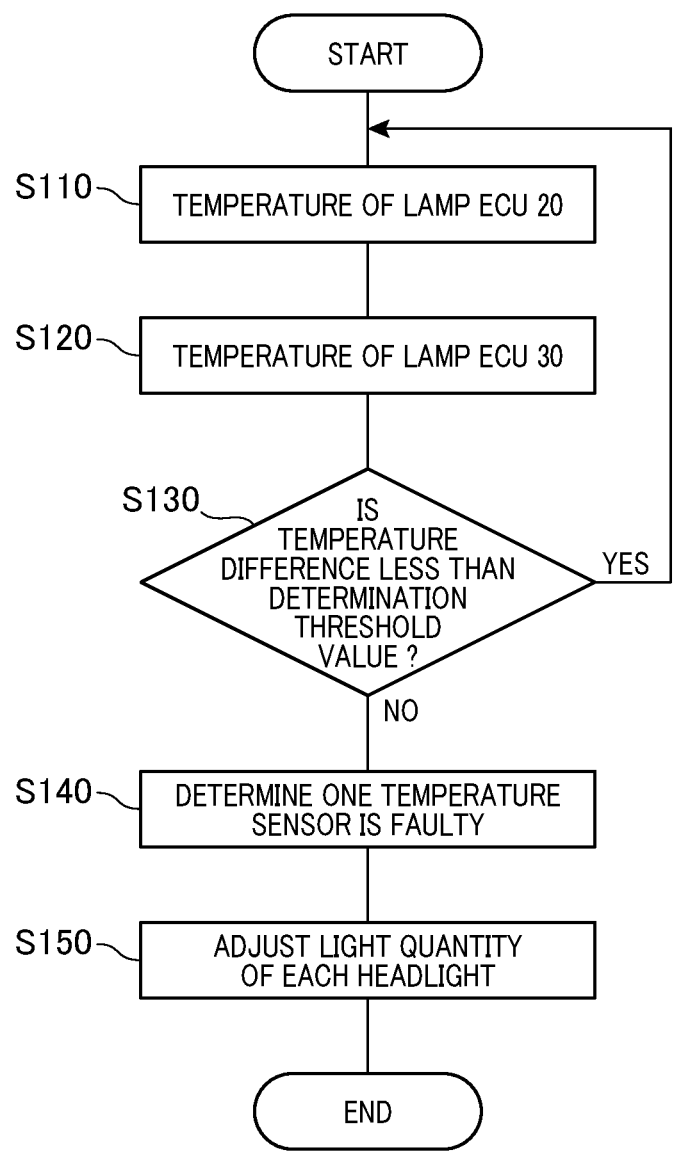
FIG. 2 is a flowchart illustrating a first control process.

The first control process executed by the control system 1 will be described with reference to the flowchart in FIG. 2.

This process is a process that is repeatedly executed when the control unit 21 and the control unit 31 perform lighting control of the headlight 10A and the headlight 10B.

Initially, in step S110, the temperature sensor 27 acquires the temperature value of the lamp ECU 20. More specifically, the temperature sensor 27 detects the temperature value of the lamp ECU 20, and outputs a signal corresponding to the detected temperature value to the control unit 21. The temperature value of the lamp ECU 20 acquired at this time is the temperature value acquired by the temperature sensor 27 during execution of the lighting control of the headlight 10A, and corresponds to a first temperature value. After that, the process proceeds to step S120.

In step S120, the temperature sensor 37 acquires the temperature value of the lamp ECU 30. More specifically, the temperature sensor 37 detects the temperature value of the lamp ECU 30, and outputs a signal corresponding to the detected temperature value to the control unit 31. The control unit 31 transmits the received signal to the control unit 21 via the in-vehicle network NT. The temperature value of the lamp ECU 30 acquired at this time is the temperature value acquired by the temperature sensor 37 during the execution of lighting control of the headlight 10B and corresponds to a second temperature value. After that, the process proceeds to step S130.

In step S130, the control unit 21 compares the temperature value of the lamp ECU 20 with the temperature value of the lamp ECU 30, and determines whether or not the difference between these temperature values is less than a preset determination threshold value. The determination threshold value is set in advance based on experimental results and the like from the aspect of determining that one of the temperature sensor 27 and the temperature sensor 37 is faulty. In the case where the difference between the temperature value of the lamp ECU 20 and the temperature value of the lamp ECU 30 is less than the determination threshold value, the process proceeds to step S110, and in the case where the difference between these temperature values is equal to or greater than the determination threshold value, the process proceeds to step S140.

In step S140, the control unit 21 performs failure determination to determine that either one of the temperature sensor 27 and the temperature sensor 37 is faulty. The control unit 21 transmits a signal indicating that the failure determination has been performed to the control unit 31 via the in-vehicle network NT. After that, the process proceeds to step S150.

In step S150, the control unit 21 adjusts the light quantity of the headlight 10A. In addition, the control unit 31 adjusts the light quantity of the headlight 10B. More specifically, the control unit 21 performs control to reduce the light quantity of the headlight 10A to a pre-determined set quantity. The set quantity is set beforehand based on experimental results and the like from the aspect of preventing the lamp ECU 20 and the lamp ECU 30 from reaching a high temperature. The control unit 31 receives a signal indicating that the failure determination has been performed, and performs control to reduce the light quantity of the headlight 10B to a set amount. After that, this process ends.

[3-2. Second Control Process]

Figure 3:
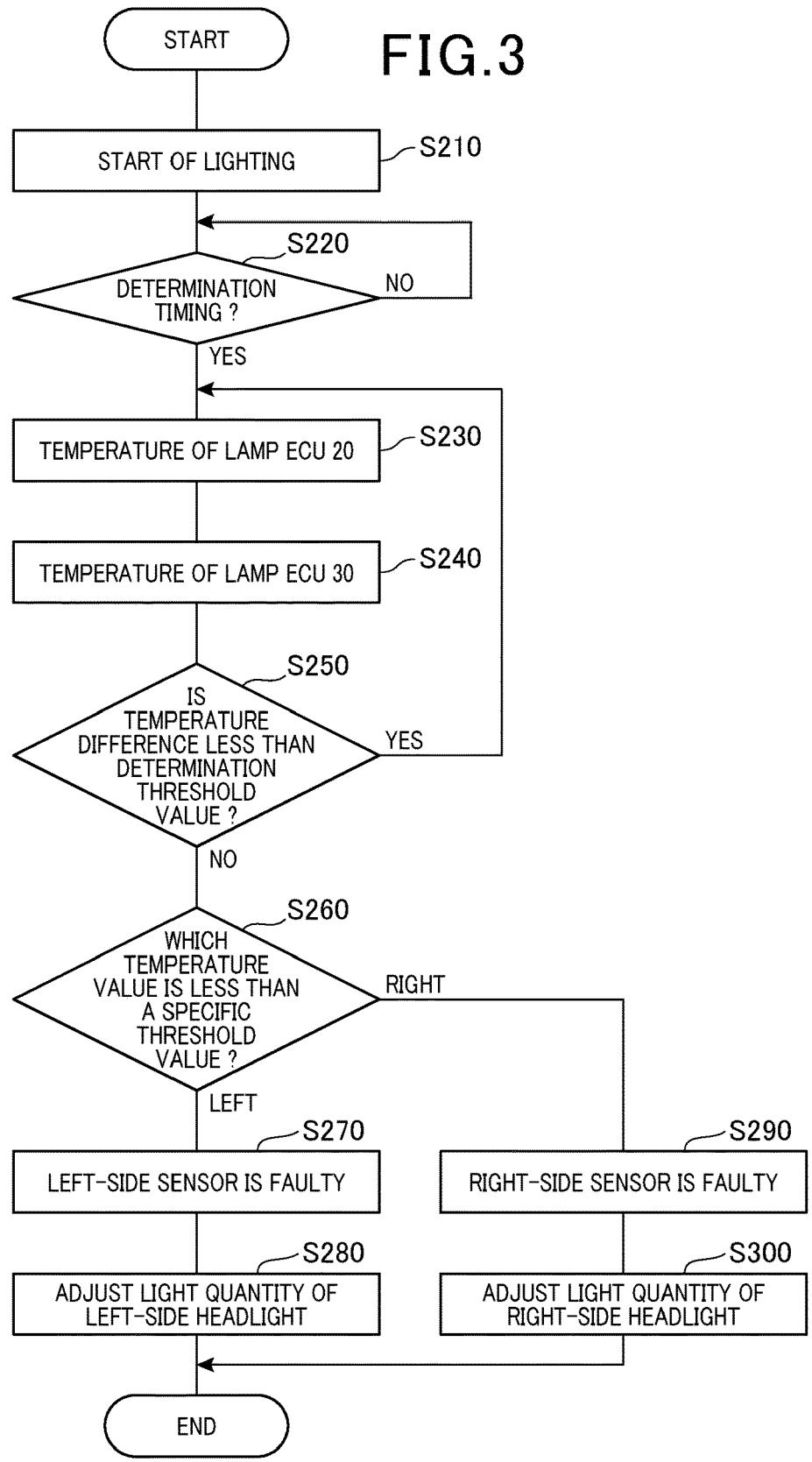
FIG. 3 is a flowchart illustrating a second control process.

The second control process executed by the control system 1 will be described with reference to the flowchart in FIG. 3.

This process is a process that is started when the body ECU 40 outputs a lighting instruction to the lamp ECU 20.

In the first step S210, the control unit 21 performs lighting control of the headlight 10A. The control unit 21 transfers the lighting instruction to the control unit 31 via the in-vehicle network NT. Upon receiving the lighting instruction, the control unit 31 performs lighting control of the headlight 10B. After that, the process proceeds to step S220.

In step S220, the control unit 21 determines whether or not it is a determination timing. The determination timing is a timing at which a preset set time has elapsed since lighting control for the headlight 10A and the headlamp 10B was started. The set time is preset from the following aspect. In other words, when the set time elapses after the lighting control for the headlamp 10A and the headlamp 10B starts, the set time is set so as to be suitable timing for determining the failure of the temperature sensor 27 and the temperature sensor 37. In the case where the timing is not the determination timing, step S220 is executed again. In the case where the timing is the determination timing, the process proceeds to step S230.

In step S230, the temperature sensor 27 acquires the temperature value of the lamp ECU 20. More specifically, the temperature sensor 27 detects the temperature value of the lamp ECU 20, and outputs a signal corresponding to the detected temperature value to the control unit 21. The temperature value of the lamp ECU 20 acquired at this time is the temperature value acquired by the temperature sensor 27 at the determination timing and corresponds to a first temperature value. After that, the process proceeds to step S240.

In step S240, the temperature sensor 37 acquires the temperature value of the lamp ECU 30. More specifically, the temperature sensor 37 detects the temperature value of the lamp ECU 30, and outputs a signal corresponding to the detected temperature value to the control unit 31. The control unit 31 transmits the received signal to the control unit 21 via the in-vehicle network NT. The temperature value of the lamp ECU 30 acquired at this time is the temperature value acquired by the temperature sensor 37 at the determination timing and corresponds to a second temperature value. After that, the process proceeds to step S250.

In step S250, the control unit 21 compares the temperature value of the lamp ECU 20 with the temperature value of the lamp ECU 30, and determines whether or not the difference between these temperature values is less than a preset determination threshold value. In the case where the difference between the temperature value of the lamp ECU 20 and the temperature value of the lamp ECU 30 is less than the determination threshold value, the process proceeds to step S220, an the case where the difference between these temperature values is equal to or greater than the determination threshold value, the process proceeds to step S260.

In step S260, the control unit 21 performs a failure determination to determine that one of the temperature sensor 27 and the temperature sensor 37 is faulty, and determines whether either one of the temperature value of the lamp ECU 20 and the temperature value of the lamp ECU 30 is less than a preset specific threshold value. The specific threshold value is set beforehand based on experimental results or the like from the aspect of determining the respective failure of the temperature sensor 27 and the temperature sensor 37. In the case where the temperature value of the lamp ECU 20 is less than the specific threshold value, the process proceeds to step S270. In the case where the temperature value of the lamp ECU 30 is less than the specific threshold value, the process proceeds to step S290.

In step S270, the control unit 21 determines that the temperature sensor 27 is faulty. After that, the process proceeds to step S280.

In step S280, the control unit 21 reduces the light quantity of the headlight 10A to a preset set quantity. After that, this process ends.

In step S290, the control unit 21 determines that the temperature sensor 37 is faulty. The control unit 21 transmits a signal indicating that the temperature sensor 37 has failed to the control unit 31 via the in-vehicle network NT. After that, the process proceeds to step S300.

In step S300, the control unit 31 receives the signal from the control unit 21 and reduces the light quantity of the headlight 10B to a set quantity. After that, this process ends.

4. Effects

According to the present embodiment described in detail above, the following effects are obtained.

In other words, in the case where the difference between the temperature value of the lamp ECU 20 and the temperature value of the lamp ECU 30 is equal to or greater than the preset determination threshold value, the control unit 21 determines that either one of the temperature sensor 27 and the temperature sensor 37 is faulty. As a result, it is possible to accurately determine whether or not the cause of not being able to detect the increase in temperature of the device during the supply of electric power to the light source is abnormality of the temperature sensor.

5. Other Embodiments

Although an embodiment according to the present disclosure has been described above, the technique according to the present disclosure is not limited to the above-described embodiment, and various modifications can be made.

(1) A plurality of functions of one constituent element in the above embodiment may be realized by a plurality of constituent elements, or one function of one constituent element may be realized by a plurality of constituent elements. In addition, a plurality of functions of a plurality of constituent element may be realized by one constituent element, or one function realized by a plurality of constituent elements may be realized by one constituent element. Moreover, a part of the configuration of the above-described embodiment may be omitted. Furthermore, at least a part of the configuration of the above-described embodiment may be added to or replaced with the configuration of another embodiment described above. Incidentally, all aspects included in the technical idea specified from the language described in the claims are embodiments of the present disclosure.

(2) In addition to the above-described control system 1, the technique according to the present disclosure can also be realized in various forms, such as a program for causing a computer to respectively function as the lamp ECU 20 and the lamp ECU 30 of the control system 1, a non-transitory tangible computer readable storage medium such as a semiconductor memory or the like that stores the program, and a control method or the like.

The invention claimed is:

1. A control system comprising:
    a first control device configured to perform lighting control of a first lamp installed in a vehicle;
    a second control device configured to perform lighting control of a second lamp installed in the vehicle;
    a first temperature sensor configured to acquire a temperature value of the first control device;
    a second temperature sensor configured to acquire a temperature value of the second control device; and
    a determining unit configured to perform failure determination for determining that either one of the first temperature sensor and the second temperature sensor is faulty in the case where during the execution of lighting control for the first lamp, a temperature value of the first control device acquired by the first temperature sensor is detected as a first temperature value, and during execution of lighting control of the second lamp, a temperature value of the second control device acquired by the second temperature sensor is detected as a second temperature value, a difference between the first temperature value and the second temperature value is equal to or greater than a preset determination threshold value.

2. The control system according to claim 1, wherein
    the first control device is configured to perform control to reduce the light quantity of the first lamp to a preset set quantity in the case where the failure determination is performed by the determining unit; and
    the second control device is configured to perform control to reduce the light quantity of the second lamp to the set quantity in the case where the failure determination is performed by the determining unit.

3. The control system according to claim 1, wherein
    one of the first lamp and the second lamp is a headlight installed on the left side of the vehicle and the other is a headlight installed on the right side of the vehicle.

4. A control system comprising:
    a first control device configured to perform lighting control of a first lamp installed in the vehicle;
    a second control device configured to perform lighting control of a second lamp installed in the vehicle;
    a first temperature sensor configured to acquire a temperature value of the first control device;
    a second temperature sensor configured to acquire a temperature value of the second control device; and
    a determining unit configured to perform failure determination for determining that either one of the first temperature sensor and the second temperature sensor is faulty in the case where timing when a preset set time has elapsed since lighting control of the first lamp and lighting control of the second lamp has started is set as a determination timing, a temperature value of the first control device acquired by the first temperature sensor at the determination timing is detected as a first temperature value, a temperature value of the second control device acquired by the second temperature sensor at the determination timing is detected as a second temperature value, and a difference between the first temperature value and the second temperature value is equal to or greater than a preset determination threshold value.

5. The control system according to claim 4, further comprising:
    a specifying unit configured to determine that the first temperature sensor is faulty in the case where the failure determination is performed by the determining unit and the first temperature value is equal to or less than a preset specific threshold value, and determine that the second temperature sensor is faulty in the case where the second temperature value is equal to or less than the specific threshold value.

6. The control system according to claim 5, wherein
    the first control device is configured to perform control to reduce the light quantity of the first lamp to a preset set quantity in the case where it is determined by the specifying unit that the first temperature sensor is faulty; and
    the second control device is configured to perform control to reduce the light quantity of the second lamp to a preset set quantity in the case where it is determined by the specifying unit that the second temperature sensor is faulty.

* * * * *